Sept. 25, 1962 P. KLAMP ET AL Re. 25,245
SUB-FLOOR CONVEYOR SYSTEM
Original Filed Oct. 25, 1957 4 Sheets-Sheet 1
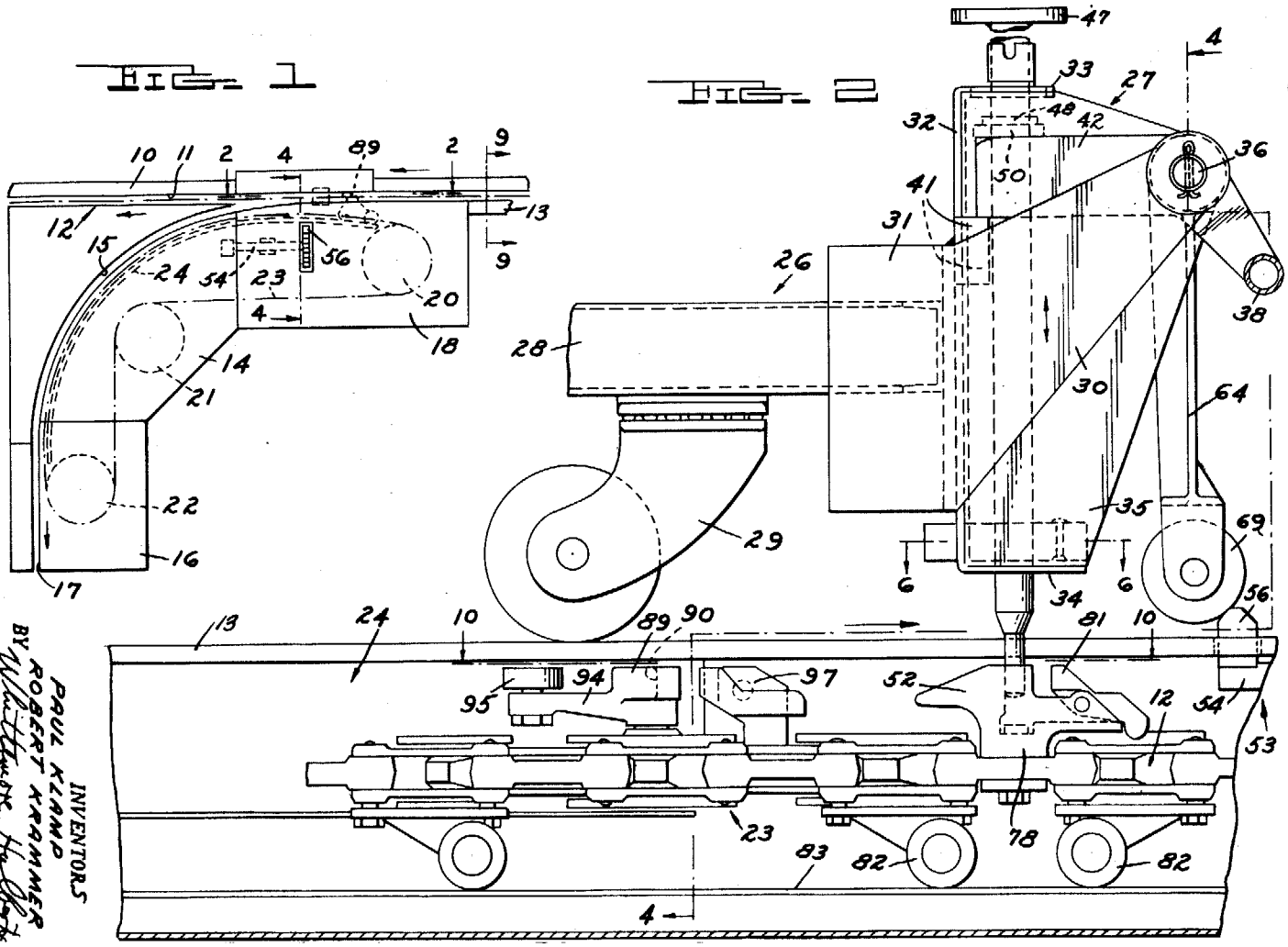
INVENTORS
PAUL KLAMP
ROBERT KRAMMER
BY Whittemore, Hulbert & Belknap
ATTORNEYS

SUB-FLOOR CONVEYOR SYSTEM

Original Filed Oct. 25, 1957 4 Sheets-Sheet 2

INVENTORS
PAUL KLAMP
ROBERT KRAMMER
BY Whittemore Hulbert & Belknap
ATTORNEYS

SUB-FLOOR CONVEYOR SYSTEM
Original Filed Oct. 25, 1957 4 Sheets-Sheet 3
FIG. 6
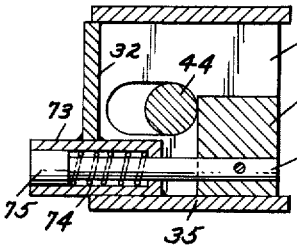
FIG. 8
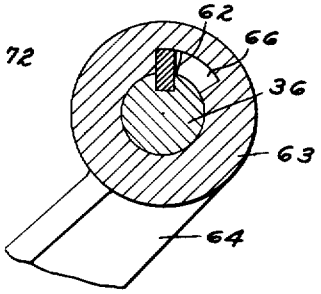
FIG. 7
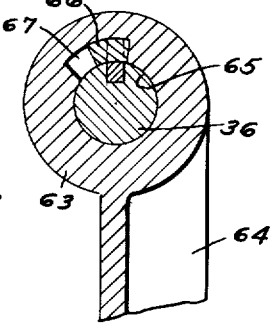
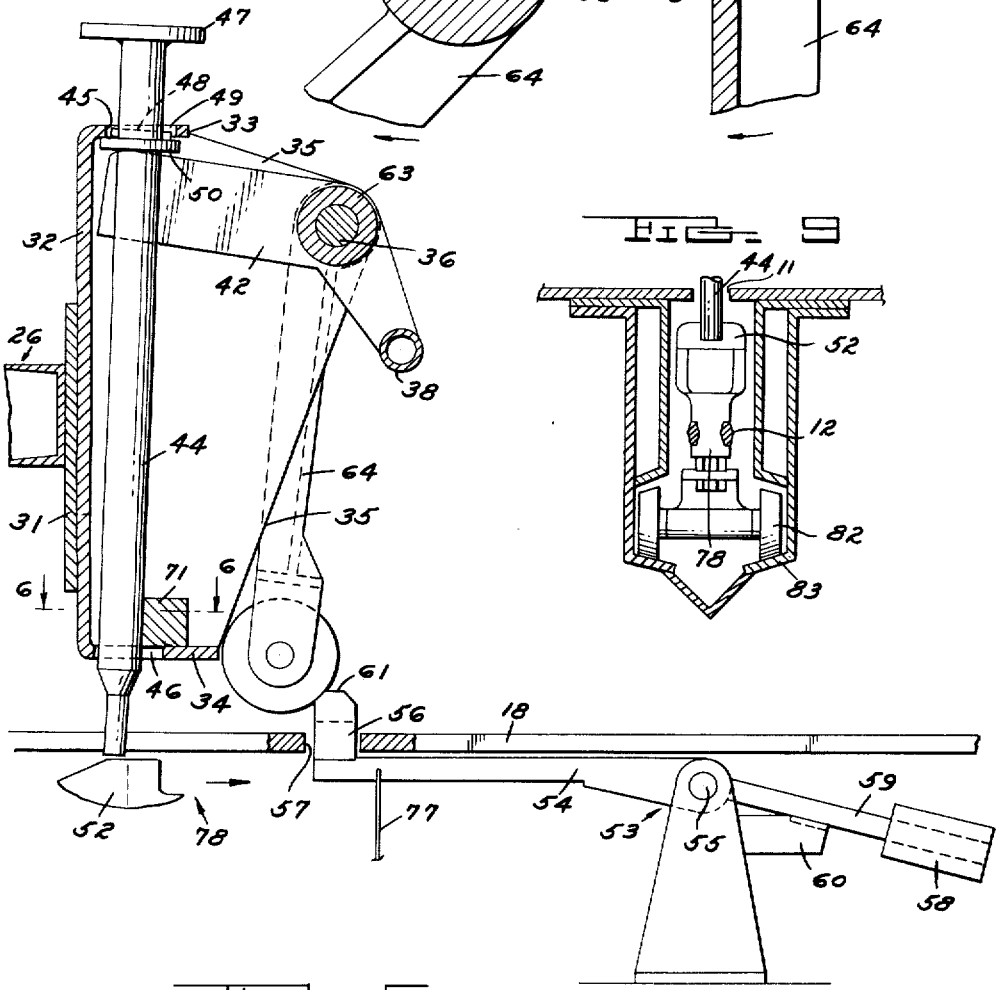
FIG. 9
FIG. 5
INVENTORS
PAUL KLAMP
ROBERT KRAMMER
BY Whittemore, Hulbert & Belknap
ATTORNEYS

SUB-FLOOR CONVEYOR SYSTEM

Original Filed Oct. 25, 1957 4 Sheets-Sheet 4

INVENTORS
PAUL KLAMP
ROBERT KRAMMER
BY Whittemore, Hulbert & Belknap
ATTORNEYS

United States Patent Office

Re. 25,245
Reissued Sept. 25, 1962

25,245

SUB-FLOOR CONVEYOR SYSTEM

Paul Klamp, St. Clair Shores, and Robert Krammer, Detroit, Mich., assignors to Mechanical Handling Systems, Inc., Detroit, Mich., a corporation of Michigan Original No. 2,965,043, dated Dec. 20, 1960, Ser. No. 692,374, Oct. 25, 1957. Application for reissue Feb. 7, 1962, Ser. No. 172,381

29 Claims. (Cl. 104—88)

Matter enclosed in heavy brackets [ ] appears in the original patent but forms no part of this reissue specification; matter printed in italics indicates the additions made by reissue.

The present invention relates to improvements in a sub-floor conveyor system for factories, warehouses, and the like, of the general type illustrated and described in the copending application of Paul Klamp, Serial No. 682,797, filed September 9, 1957.

Inasmuch as the invention more particularly pertains to automatic provisions whereby trucks, dollies, and the like, are switched as desired in their transfer from the control of one sub-floor conveyor chain to a track reach at an angle to the path of that chain, in the interest of simplicity and clarity only a very simple layout embodying such switch means has been selected for illustration.

However, it is to be understood that the improvements of the invention may be employed in various types of conveyor layouts of more or less complex nature, and in these various systems the matter of whether a truck or like load bearing unit is transferred from a main power conveyor of a loop system onto a connecting or return branch thereof, free or power driven in character, or onto a side branch which may be a dead line, or other connecting or disposal point as called for by the purpose of the system, is immaterial insofar as the special improvements in the switching arrangement are concerned.

Moreover, as will appear to those skilled in the art, the switching mechanism may have utility in a conveyor system in which the actuation of trucks or like load bearing units is effected from beneath the floor, as herein shown, or from above.

It is an object of the invention to provide truck conveyor switching mechanism as referred to above, involving improved tow pin structure on the individual trucks and improved means whereby the truck tow pins are disconnected from the actuating conveyor in an automatic fashion.

A further object of a more specific nature is to provide a switching mechanism including a sub-floor conveyor chain by which trucks are normally transported along a main or power driven path, a retractable tow pin structure on the individual truck connected to an actuator for disconnecting the pin from the main conveyor momentarily, and a transfer or branch conveyor to make connection with the tow pin after such disengagement and advance the pin and its truck onto a branch or transfer track reach.

Another object is to provide a switching arrangement as described, in which the actuator to retract the tow pin is automatically operated by a sub-floor mounted comb arm, and in which there are provisions to selectively adjust the actuator in relation to such comb arm whereby the tow pin is retracted out of driving relation to a power conveyor trolley or not, in accordance with the adjusted setting of the actuator.

Yet another specific object is to provide a conveyor switching mechanism of the foregoing type, involving a sub-floor transfer conveyor having tow pin pusher dogs thereon which are normally maintained in position to push the tow pins by guided engagement with a fixed upright track or rail beneath the floor of the installation. In a suggested adaptation of the switching mechanism, the transfer conveyor dogs are allowed to fall away from the tow pins after switching, so that the trucks may be advanced manually along the transfer or branch reach.

It is a general object of the invention to provide switch mechanism of the type described, which is mechanically constituted throughout, being free of electrical, pneumatic and hydraulic operation controls, such as are very expensive and require considerable maintenance, and to provide a switch mechanism in which the switching is initiated by the truck which is to be switched, in accordance with the adjusted setting of its actuator as referred to above.

Other objects and features of the invention will become apparent as the description proceeds, especially when taken in conjunction with the accompanying drawings, wherein:

FIG. 1 is a fragmentary top plan view of a typical and simple installation of the improved switching apparatus in a factory, warehouse, loading dock or like installation;

FIG. 2 is a fragmentary side elevational view in enlarged scale, as viewed from the line 2—2 of FIG. 1, of the improved truck-controlled switching and transfer chain mechanism of the invention;

FIG. 5 is a fragmentary view in longitudinal vertical section along line 5—5 of FIGS. 3 and 4;

FIG. 6 is a view in horizontal section along a line corresponding to the line 6—6 of FIGS. 2 and 5;

Figure 4:
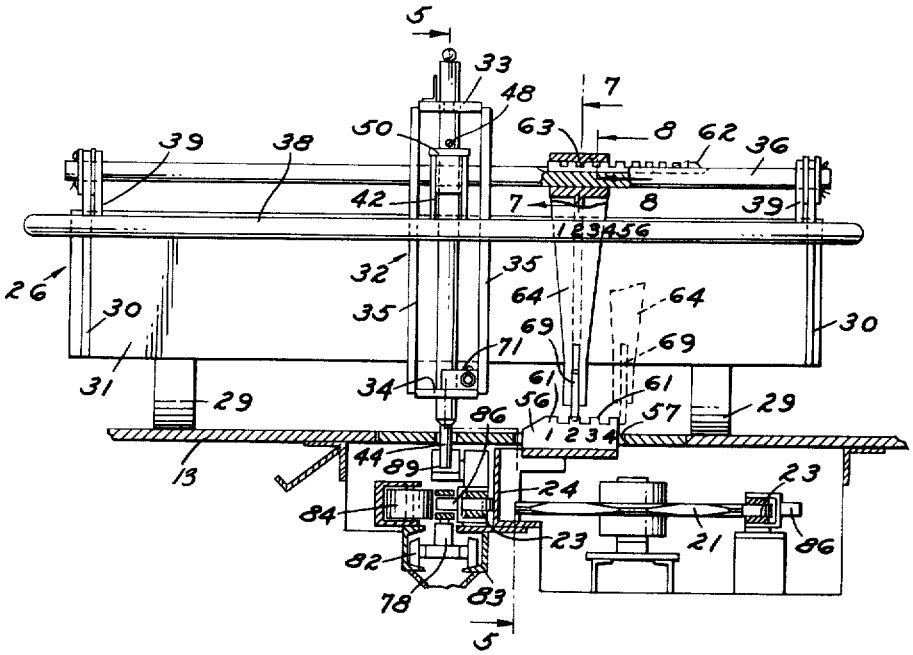
FIG. 4 is a view in vertical transverse section along line 4—4 of FIGS. 1 and 2, further illustrating the adjustable, comb-type switch arrangement.
Figure 10:
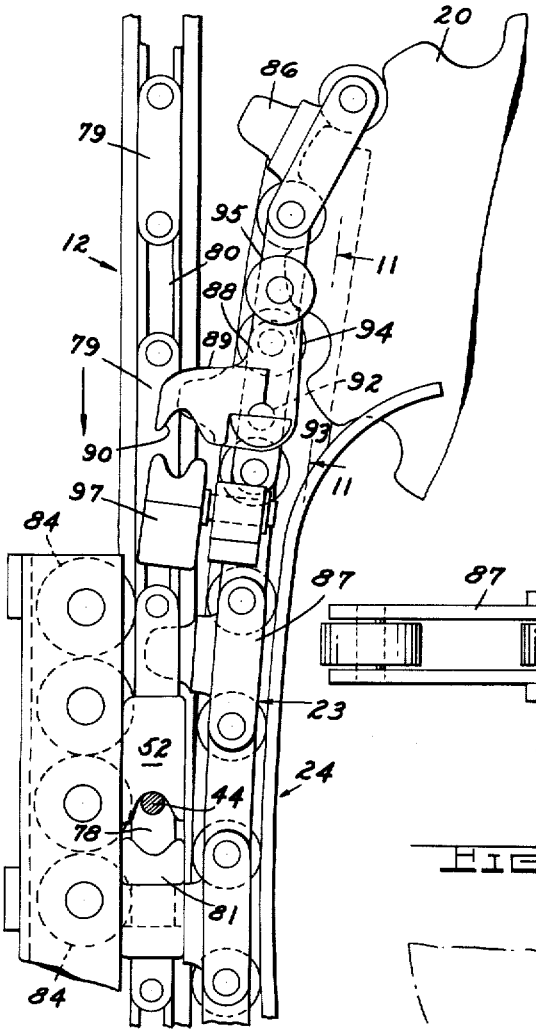
Figure 12:
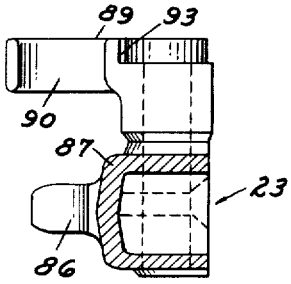
Figure 11:
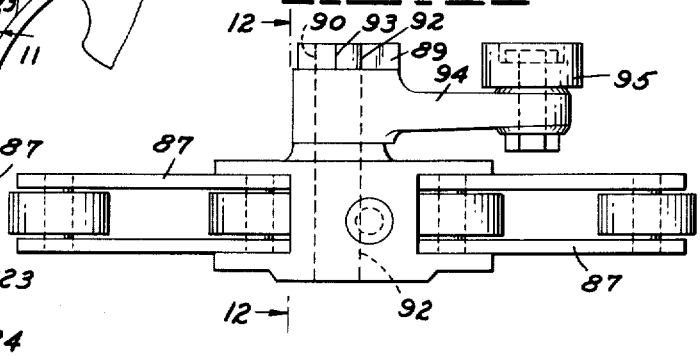

FIGS. 7 and 8 are fragmentary views in vertical longitudinal section along lines 7—7 and 8—8, respectively, of FIG. 4, being enlarged in scale;

FIG. 9 is a fragmentary view in transverse vertical section along line 9—9 of FIG. 1;

FIG. 10 is a fragmentary plan view, as viewed from line 10—10 of FIG. 2, showing a portion of the transfer and main trolley conveyor means;

FIG. 11 is a side elevational view of the transfer chain in enlarged scale as viewed from line 11—11 of FIG. 10;

FIG. 12 is a view in vertical section along line 12—12 of FIG. 11; and

Figure 13:
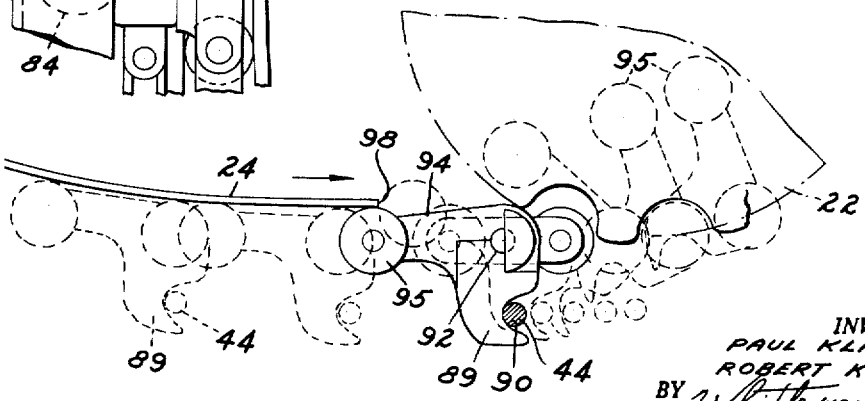

FIG. 13 is a schematic top plan view showing an arrangement for decoupling the truck from the transfer chain upon entry onto a branch reach or like reach to which the truck is switched.

FIG. 1 of the drawings illustrates a typical, simple layout for a factory, warehouse or like installation in which a main conveyor track reach 10 is provided with an elongated floor slot 11 beneath which continuously travels an elongated endless conveyor chain, generally designated 12. Insofar as the invention is concerned, the flooring of the installation may be considered to be constituted by a floor plate section 13 in which the slot 11 is formed, a further corner floor plate section 14 coacting with the section 13 in defining an arcuate slot 15 which merges rearwardly with the main floor slot 11, another floor plate section 16 partially defining a branch slot 17, and a still further section 18 in part defining the main conveyor floor slot 11. These sections cover a set of transfer conveyor chain sprockets 20, 21 and 22, all idlers mounted on vertical axes.

An endless transfer chain 23 is trained about these sprockets in a generally L-shaped outline, rounded along one reach in general conformity with the shape of the transfer floor slot 15. Suitable provision is made to guide the chain 23 about this reach, in the form of an upright backing rail 24 (FIGS. 4 and 10) having a further function to be described.

However, it is in order at this point to describe the improvement, referring to FIGS. 2 through 6, in reference to the individual load bearing trucks, generally designated 26, and the tow pin assembly thereof, generally designated 27, by which the transferring of the truck travel is controlled.

Figure 3:
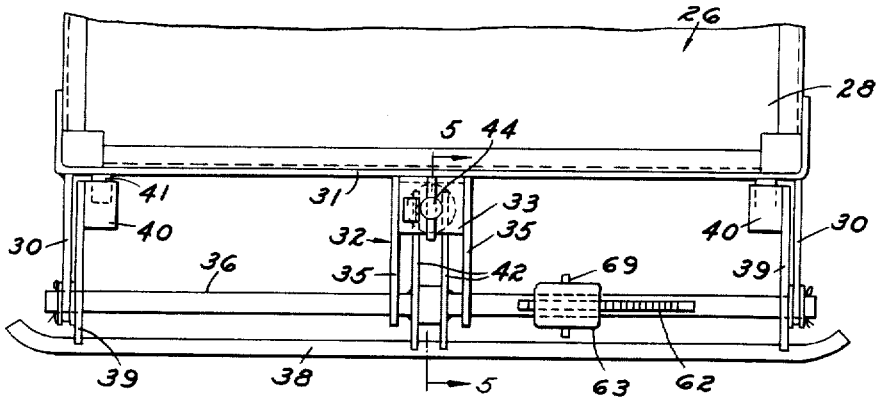
FIG. 3 is a top plan view of a load bearing truck equipped with individual adjustable switching means.

Each truck 26 includes a well braced horizontal platform 28 of rectangular outline, equipped with pairs of front and rear swiveled floor casters 29. The tow pin assembly 27 is mounted to the forward cross piece of the truck 26 by means of a pair of end bearing plates or brackets 30, one projecting forwardly from either side of the truck platform 28, and by a center bracket unit. As best illustrated in FIGS. 3, 4 and 5, this unit comprises a vertical plate 31 welded to the truck cross piece and having an upright channel member 32 secured thereto which is provided with forwardly projecting top and bottom flanges 33, 34, respectively, as well as vertical, forwardly projecting side bearing plates 35 spaced laterally from one another. An elongated transverse hinge rod 36 is journaled medially and adjacent its ends in the bearing plates 35, 30, respectively, cotter pins at the plates 30 restraining its endwise movement.

The reference numeral 38 generally designates the front bumper or bumper bar of the truck. It extends horizontally and transversely of the truck, being provided at its ends with rearward hinge arms 39 secured by weld to the hinge rod 36; and the rear extensions of these arms are equipped with counterweights 40. The weights 40 urge the bumper 38 upwardly, i.e., counterclockwise as viewed in FIG. 2, and with the bar in its normal elevated position of that figure they rest on fixed stops 41 on the truck. Adjacent the center thereof, the bumper 38 carries a pair of rearwardly extending, relatively closely spaced hinging arms 42, also welded to the hinge rod 36.

The rear extremities of these arms 42 laterally straddle the upright tow pin 44 of the truck, which tow pin is vertically guided in an aperture 45 in the top flange 33 of the mounting bracket 32 (see FIG. 5), and an elongated slot 46 in the lower bracket flange 34. The top of the tow pin 44 is provided with a hand grip 47, and beneath this grip a locking pin 48 extends transversely through the tow pin, being receivable in key slots 49 of the guide aperture 45. If desired, the tow pin 44 may be elevated to bring the pin 48 through the slot 49, then rotated 90° to hold it in an elevated position.

A circular collar 50 is loosely mounted on the tow pin 44 beneath the locking pin 48, and the collar 50 is engageable from beneath by hinge arms 42, as shown in FIG. 5, to elevate tow pin 44 to the position in that figure.

Such elevation may be occasioned by an impact of the front bumper 38 with a preceding truck, in which case the tow pin 44 is elevated out of driving relation to either the branch conveyor 23 or a trolley pusher dog 52 of the main conveyor system, shown in FIG. 5, in a manner to be described.

However, the tow pin 44 is also capable of being automatically elevated to the position referred to in a switching operation. This involves the operation of the tow pin assembly 27 by an automatic sub-floor comb device 53, including an arm 54 horizontally pivoted at 55 and provided with a comb-type tripping head 56 acting through a floor plate aperture 57. The arm 54 is urged by a counterweight 58 on a rear extension 59 thereof, normally resting on a fixed stop 60.

Referring to FIG. 4 of the drawings, the comb head 56 is provided with longitudinally spaced teeth 61.

Referring now to FIGS. 3, 4 7 and 8 of the drawings, the hinge rod 36 has a key way or slot along its top receiving a toothed comb 62, and the top hub 63 of a pivotal switch actuator arm *or control actuator* 64 is received on the rod 36 in surrounding relation to the comb 62. The hub 63 has its internal bore 65 shaped to provide a single arcuate, radially inwardly projecting key shoulder 66 which, when engaged between successive teeth of the comb 62, locks the actuator arm 64 in a selected, axially adjusted position in relation to the hinge rod 36, as well as to the sub-floor comb head 56. Forwardly of the shoulder 66, the bore 65 of the arm hub is longitudinally slotted at 67, so that if the actuator arm *or control actuator* 64 is swung clockwise or forwardly, from the position of FIG. 7 to that of FIG. 8, the comb 62 is brought into alignment with the hub slot 67, permitting the endwise adjustment referred to above. As aligned with the desired comb space of the key comb 62, the arm is allowed to return to the position of FIG. 7.

The free lower end of the actuator arm 64 is provided with a tappet roller 69 adapted to strike a comb tooth 61 of the head 56 (as shown in solid line in FIG. 4) to miss such a tooth and pass between adjacent teeth, or to miss the comb head 56 entirely (dotted line) depending upon the axial adjustment of the arm 64. To facilitate this, the bumper 38 may be appropriately keyed numerically with the comb head 56, as shown in FIG. 4.

If set for switching action, a truck 26 proceeding on the main conveyor in the direction indicated by arrow in FIG. 5, will have its actuator arm tappet roller 69 engaged by the comb head 56, causing the arm 64, through its hub 63, to swing the hinge rod 36 clockwise as viewed in that figure (or counterclockwise in FIG. 7). This elevates the forked hinge arms 42 against the collar 56 and thus lifts the tow pin 54 upwardly out of engagement with the main conveyor trolley dog 52. The truck 26 is thus drivingly de-coupled from the main conveyor.

In order to insure that the pin cleanly disengages the trolley dog 52, the pin is urged rearwardly, as shown in FIGS. 5 and 6 of the drawings, by a small slide block 71 resting on the lower mounting bracket flange 34; the block fixedly carries a pin 72 extending into a guide cup 73 secured to the upright of the bracket 32, and a small coil spring 74 acts between this cup and an enlarged head 75 of the pin 72. Thus as the tow pin 44 upwardly clears the trolley dog 52 it is swung a few degrees toward the rear by the slide block 71, and is prevented from reentering into engagement with the trolley dog.

After the arm 64 passes over the comb head 61, depressing the same in doing so, the tow pin 44 descends gravitationally and is restored into position for engagement by the transfer chain 23, as will be described. If desired, provision may be made, as by flexible cable 77, to control the comb device 53 by shifting its arm 54 and head 56 to a lowered, inoperative position, in which switching of trucks under its control no longer takes place.

Referring now to FIGS. 2, 4 and 10 through 12, the main sub-floor conveyor chain 12 of the system is provided at suitable longitudinally spaced intervals with trolleys 78 on *certain of* its articuated links 79, 80, the dogs 52 being fixed to the [links.] *trolleys and certain of the links 80.* Each trolley 78 is also provided with a forward pivoted restraining dog 81, as shown in FIG. 2. The conveyor chain 12 is guided in its endless path by its trolleys 78 which, as shown in FIG. 4, are equipped with track rollers 82 traveling a suitable sub-floor track 83. The conveyor 12 may be laterally guided adjacent the switch zone by a series of vertically journaled back-up rollers 84.

In accordance with the invention, the transfer chain 23 derives its power by caterpillar coaction with the main conveyor chain 12, and to this end it is provided with driven dogs 86 which are received in the main conveyor chain links 79. At suitable spaced intervals, the articulated links 87 of the transfer conveyor 23 are provided with pusher dogs 88. Each pusher dog includes a laterally outwardly extending hook arm 89, forwardly recessed at 90 to receive and seat the lower end of a truck tow pin 44. The dogs are pivoted on the chain 23 at 92, and each is adapted to be restrained against undue counter-clockwise rotation (as viewed in FIG. 10) about this axis by engagement with a fixed stop shoulder 93 on the chain link adjacent the pivot 92.

Furthermore, each of the dogs 89 is provided with a trailing guide arm 94 equipped with a follower roller 95 adapted to bear against the fixed upright guide rail 24. This restrains the dog 89 against clockwise rotation, as viewed in plan, and keeps it in position for driving engagement with the truck tow pin 44 when the latter is reached. A forward restraining member 97 is associated with each dog 89, for the purpose of preventing forward over-run of the tow pin 44 relative to that dog.

Referring to FIG. 13, in conjunction with FIG. 1, the trucks 26 are released from driving engagement by the dogs 89, after the tow pin 44 has been drawn about the transfer reach or slot 15 and into the branch slot 17, by simply releasing the follower roller 95 of the dog from restraining engagement by the back-up rail 24, prior to the chain 23 rounding the idler sprocket 22. As the follower falls away from the rail end 98, the dog 89 may swing clockwise through the successive positions illustrated in dotted line in FIG. 13, and the truck 26 will come to a halt. However, if desired, the transfer conveyor may include a reach extending along the branch floor slot 17, and the back-up rail 24 may also be continued therealong, if a positive drive of the trucks along the branch is desired.

In operation, assuming that a truck 26 is to be switched by transfer conveyor chain 23 so that its tow pin 44 enters into a branch or transfer floor slot 17 (which may be one of a number of such branch slots), an attendant simply places the truck actuator arm 64 for the tow pin in such position laterally of the hinge rod 36 that the actuator tappet roller 69 will strike a comb tooth 61 of the sub-floor comb head 56 which controls switching into the branch slot 17. Upon actuation by the comb head, the actuator arm 64 elevates tow pin 44 out of engagement with the main track trolley dog 52 by which the truck has been advanced, and the spring urged block 71 insures that the pin will not re-engage with that dog.

The next advancing transfer chain dog 88 picks up the tow pin, being held in position for its hook 89 to positively engage the pin by rolling engagement of the dog follower 95 with back-up rail 24. Thus the hook 90 pulls the free truck 26 onto the branch or transfer reach.

Should it be desired that a truck 26 pass a junction point of the main and branch track reaches, the actuator arm 64 is simply positioned to avoid engagement with a comb head tooth 61 of the junction point in question, and placed in position for engagement, if desired, with the comb head 56 of a further branch, at which the truck releasing and transferring operations described above will then take place.

*The flexible cable 77 (FIG. 5) affords alternate means to enable a truck to pass a junction point without switching. Thus, as operated by cable 77 the arm 54 and head 56 may be swung downwardly about sub-floor pivot 55, enabling actuator arm 64 to pass over the control zone of device 53 without lifting the tow pin 44 from driving engagement by the pusher dog 52. Remote operation of the cable 77 might be either manual or in response to a signal initiated by an advance truck and indicating that the switching of a following truck onto a branch or other line occupied by the advance truck is to be avoided.*

The mechanisms involved are simple and inexpensive, and rugged and reliable in operation. Control of trolley travel and switching is effected solely by coaction of the truck itself and certain sub-floor agencies. The simplicity of the structural provisions renders the invention widely adaptable to installations of many different types and of widely differing individual make-up and degree of complexity.

What we claim as our invention is:

1. In combination with a sub-floor conveyor system having divergent track slots, conveyor means operating therebeneath, and a sub-floor unit to control traffic in said slots, a mobile load bearing truck provided with a vertically movable tow element adapted to depend through said slots to guide said truck therealong as moved by said conveyor means and controlled by said control unit, said truck having thereon a control actuator operatively connected to said tow element and provided with means selectively engageable with said sub-floor control unit, and being moved by said engagement with said sub-floor control unit to move said tow element vertically out of position for engagement by said conveyor means, whereby to control movement of said truck by said conveyor means, and means to adjust said actuator on said truck transversely of the path of movement of the truck, thereby to govern its engagement with said control unit.

2. A conveyor system comprising means defining conveyor tracks converging at a switching zone at an angle other than a right angle, endless conveyors having means actuating the same for travel parallel to said respective tracks in vertically spaced and aligned relation thereto, each of said conveyors having longitudinally spaced dogs which pass through a place in said switching zone which is common to the paths of the dogs of both conveyors in the travel of said conveyors, mobile load bearing units having tow members projecting vertically across the path of travel of said dogs at said common place to be engaged and driven by the dogs on said respective conveyors if said tow members and dogs are in predetermined vertical positional relation to one another, means mounting said tow members on said load bearing units for relative vertical movement of said dogs and tow members, and means mounted adjacent one of said tracks in a position to be engaged by and to operate said load bearing units to selectively alter the relative vertical position of a dog of said one conveyor and a tow member of a load bearing unit at said common place for selective disengagement at said place of said member and dog, a dog of the other conveyor traversing said common place in a position to engage and advance said unit in the direction of the track of said last named conveyor, said actuating means for said conveyors including means driving the latter to advance the dogs of said one thereof through said common place in predetermined timed relation to those of the other.

3. A conveyor system in accordance with claim 2, and further comprising means engaging said tow members at said switching zone to urge said load bearing units transversely of the track of said one conveyor and into the track of said other conveyor.

4. A conveyor system in accordance with claim 2, and further comprising means on the dogs of said other conveyor engaging said tow members at said switching zone to urge said load bearing units transversely of the track of said one conveyor and into the track of said other conveyor.

5. A conveyor system in accordance with claim 2, and further comprising means engaging said tow members at said switching zone to urge said load bearing units transversely of the track of said one conveyor and into the track of said other conveyor, and means adjacent said last named track to interrupt the driving engagement of the dogs of said other conveyor with said tow members.

6. A conveyor system in accordance with claim 2, and further comprising means on the dogs of said other conveyor engaging said tow members at said switching zone to urge said load bearing units transversely of the track of said one conveyor and into the track of said other conveyor, and means adjacent said last named track to interrupt the driving engagement of the dogs of said other conveyor with said tow members.

7. A conveyor system in accordance with claim 2, in which said tow members have means operatively connected thereto and actuated by said means engaged by and operating said load bearing units for shifting said tow members vertically out of position to be engaged by a conveyor dog.

8. A conveyor system in accordance with claim 2, in which said load bearing units have a bumper movably mounted thereon and moved by impact with another object, and means operatively connecting said bumper to the tow member to shift the latter vertically out of position to be engaged by a conveyor dog.

9. A conveyor system in accordance with claim 2, in which said tow members have means operatively connected thereto and actuated by said means engaged by and operating said load bearing units for shifting said tow members vertically out of position to be engaged by a conveyor dog, said load bearing units having a bumper movably mounted thereon and moved by impact with another object, and means operatively connecting said bumper to the tow member to shift the latter vertically out of position to be engaged by a conveyor dog.

10. A conveyor system in accordance with claim 2, in which said tow members have means operatively connected thereto and actuated by said means engaged by and operating said load bearing units for shifting said tow members vertically out of position to be engaged by a conveyor dog, and further comprising means on the dogs of said other conveyor engaging said tow members at said switching zone to urge said load bearing units transversely of the track of said one conveyor and into the track of said other conveyor.

11. A conveyor system in accordance with claim 2, in which said load bearing unit have a bumper movably mounted therein and moved by impact with another object, and means operatively connecting said bumper to the tow member to shift the latter vertically out of position to be engaged by a conveyor dog, and further comprising means on the dogs of said other conveyor engaging said tow members at said switching zone to urge said load bearing units transversely of the track of said one conveyor and into the track of said other conveyor.

12. A conveyor system in accordance with claim 2, in which said tow members have means operatively connected thereto and actuated by said means engaged by and operating said load bearing units for shifting said tow members vertically out of position to be engaged by a conveyor dog, said load bearing units having a bumper movably mounted thereon and moved by impact with another object, and means operatively connecting said bumper to the tow member to shift the latter vertically out of position to be engaged by a conveyor dog, and further comprising means on the dogs of said other conveyor engaging said tow members at said switching zone to urge said load bearing units transversely of the track of said one conveyor and into the track of said other conveyor.

13. A conveyor system in accordance with claim 2, in which said tow members have means operatively connected thereto and actuated by said means engaged by and operating said load bearing units for shifting said tow members vertically out of position to be engaged by a conveyor dog, and further comprising means engaging said tow members at said switching zone to urge said load bearing units transversely of the track of said one conveyor and into the track of said other conveyor.

14. A conveyor system in accordance with claim 2, in which the dogs of said other conveyor are pivotally mounted thereon for movement to and from position to engage and drive a tow member, and means for holding said dogs in said engaging and driving position as they pass through said switching zone, and for releasing said dogs for movement out of said engaging and driving position after passing through said switching zone.

15. A conveyor system in accordance with claim 2, in which said tow members of said load bearing units each have selectively positional means on said load bearing unit operatively connected thereto to vertically shift the tow member out of position to be engaged by a conveyor dog, and means to position said last named means to exert said shifting action on the tow member or not.

16. A conveyor system in accordance with claim 2, in which said tow members of said load bearing units each have selectively positional means on said load bearing unit operatively connected thereto to vertically shift the tow member out of position to be engaged by a conveyor dog, and means to position said last named means to exert said shifting action on the tow member or not, and means located in advance of said switching zone and engageable with said means on said unit to actuate the latter or not, in accordance with the selectively adjustable position thereof.

*17. In combination in a sub-floor conveyor system having floor track slots in convergent relation to one another in a switching zone, conveyor means operating beneath at least one of said slots, a sub-floor unit to control traffic in said slots, a mobile load bearing truck provided with a movable tow element adapted to depend through said slots to guide said truck therealong as moved by said conveyor means and controlled by said sub-floor unit, said truck having thereon a control actuator having means operatively connecting the same to said tow element, said control actuator being engageable with said sub-floor control unit in the travel of the truck, and being moved by said engagement with said sub-floor control unit to cause movement of said tow element, through the agency of said connecting means, out of position for engagement by said conveyor means, whereby to control movement of said truck by said conveyor means, and means to operate said control unit from a relatively remote point into and out of position in which it is engaged by said control actuator to move the latter.*

*18. In combination in a sub-floor conveyor system having floor track slots in convergent relation to one another in a switching zone, conveyor means operating beneath at least one of said slots, a sub-floor unit to control traffic in said slots, a mobile load bearing truck provided with a movable tow element adapted to depend through said slots to guide said truck therealong as moved by said conveyor means and controlled by said sub-floor unit, said truck having thereon a control actuator having means operatively connecting the same to said tow element, said control actuator being engageable with said sub-floor control unit in the travel of the truck, and being moved by said engagement with said sub-floor control unit to cause movement of said tow element, through the agency of said connecting means, out of position for engagement by said conveyor means, whereby to control movement of said truck by said conveyor means, the position of said control actuator being adjustable on said truck transversely of the path of movement of the truck to control the engagement or non-engagement of the actuator with said control unit, and means to operate said control unit into and out of position in which it is engaged by said control actuator to move the latter, said last named means being operatively connected to said control unit from a sub-floor point.*

*19. In combination in a sub-floor conveyor system having floor track slots meeting in convergent relation at an acute angle to one another in a switching zone, conveyor means operating beneath at least one of said slots, a sub-floor unit to control traffic in said slots, and a mobile load* bearing truck provided with a movable tow element adapted to depend through said slots to guide said truck therealong as moved by said conveyor means and controlled by said sub-floor unit, said truck having thereon a control actuator having means operatively connecting the same to said tow element, said control actuator being engageable with said sub-floor control unit in the travel of the truck, and being moved by said engagement with said sub-floor control unit to cause movement of said tow element, through the agency of said connecting means, out of position for engagement by said conveyor means, whereby to control movement of said truck by said conveyor means, the position of said control actuator being adjustable on said truck transversely of the path of movement of the truck to control the engagement or non-engagement of the actuator with said control unit.

20. In combination in a sub-floor conveyor system having floor track slots meeting in a switching zone, conveyor means operating beneath at least one of said slots, a sub-floor unit to control traffic in said slots, and a mobile load bearing truck provided with a vertically movable tow element to depend through said slots and guide said track therealong as controlled by said sub-floor unit, said truck having thereon a control actuator operatively connected to said tow element and being selectively engageable with said sub-floor control unit in the movement of the truck, and being moved by said engagement to cause movement of said tow element vertically out of position for engagement by said conveyor means, whereby to control movement of said truck by said conveyor means, the position of said control actuator being adjustable on said truck to control the engagement or non-engagment of the actuator with said control unit.

21. In combination in a sub-floor conveyor system having floor track slots meeting in a switching zone, conveyor means operating beneath at least one of said slots, a sub-floor unit to control traffic in said slots, a mobile load bearing truck provided with a vertically movable tow element to depend through said slots and guide said truck therealong as controlled by said sub-floor unit, said truck having thereon a control actuator operatively connected to said tow element and being selectively engageable with said sub-floor control unit in the movement of the truck, and being moved by said engagement to cause movement of said tow element vertically out of position for engagement by said conveyor means, whereby to control movement of said truck by said conveyor means, the position of said control actuator being adjustable on said truck to control the engagement or non-engagement of the actuator with said control unit, and means to operate said control unit into and out of position in which it is engaged by said control actuator to move the latter, said last named means being operatively connected to said control unit from a sub-floor point.

22. The combination in accordance with claim 20, in which said control actuator has means operatively connecting the same with said tow element to lift the latter out of position for engagement by said conveyor means.

23. The combination in accordance with claim 21, in which said control actuator has means operatively connecting the same with said tow element to lift the latter out of position for engagement by said conveyor means.

24. In combination, for use in a conveyor system having track slots in convergent relation to one another in a switching zone, conveyor means operating adjacent and in general parallelism with at least one of said slots, and a mobile load bearing member adapted to be propelled by said conveyor means, a control member to control traffic in said slots, and a tow element movably mounted on said load bearing member, said tow element being adapted to extend into said slots to be propellingly engaged by said conveyor means and to guide said load bearing member as propelled by said conveyor means and controlled by said control member, said load bearing member being provided with a control actuator operatively connected to said tow element, said control actuator being engageable with said control member in the travel of the truck and being moved by said engagement to cause movement of said tow element out of position for engagement by said conveyor means.

25. In combination, for use in a conveyor system having track slots in convergent relation to one another in a switching zone, conveyor means operating adjacent and in general parallelism with at least one of said slots, and a mobile load bearing member adapted to be propelled by said conveyor means, a control member to control traffic in said slots, and a tow element movably mounted on said load bearing member, said tow element being adapted to extend into said slots to be propellingly engaged by said conveyor means and to guide said load bearing member as propelled by said conveyor means and controlled by said control member, said load bearing member being provided with a control actuator operatively connected to said tow element, said control actuator being engageable with said control member in the travel of the truck and being moved by said engagement to cause movement of said tow element out of position for engagement by said conveyor means, said load bearing member being provided with a bumper element operatively connected with said tow element to move the latter out of position for propelling engagement by said conveyor means upon impact of said bumper element with another object.

26. In combination for use in a conveyor system having track slots in convergent relation to one another in a switching zone, conveyor means operating adjacent and in general parallelism with at least one of said slots, and a mobile load bearing member adapted to be propelled by said conveyor means, a movable control member to control traffic in said slots, a tow element movably mounted on said load bearing member, said tow element being adapted to extend into said slots to be propellingly engaged by said conveyor means and to guide said load bearing member as propelled by said conveyor means and controlled by said control member, said load bearing member being provided with a control actuator operatively connected to said tow element, said control actuator being engageable with said control member in the travel of the truck and being moved by said engagement to cause movement of said tow element out of position for engagement by said conveyor means, and means to operate said control member from a relatively remote point to move the same out of position in which it is engaged by said control actuator to move the latter.

27. In combination for use in a conveyor system having track slots in convergent relation to one another in a switching zone, conveyor means operating adjacent and in general parallelism with at least one of said slots, and a mobile load bearing member adapted to be propelled by said conveyor means, a movable control member to control traffic in said slots, a tow element movably mounted on said load bearing member, said tow element being adapted to extend into said slots to be propellingly engaged by said conveyor means and to guide said load bearing member as propelled by said conveyor means and controlled by said control member, said load bearing member being provided with a control actuator operatively connected to said tow element, said control actuator being engageable with said control member in the travel of the truck and being moved by said engagement to cause movement of said tow element out of position for engagement by said conveyor means, said load bearing member being provided with a bumper element operatively connected with said tow element to move the latter out of position for propelling engagement by said conveyor

*means upon impact of said bumper element with another object, and means to operate said control member from a relatively remote point to move the same out of position in which it is engaged by said control actuator to move the latter.*

*28. The combination in accordance with claim 24, in which the position of said control actuator is adjustable on said load bearing member transversely of the path of movement of the latter to control the engagement or non-engagement of the actuator with said control member.*

*29. The combination in accordance with claim 26, in which the position of said control actuator is adjustable on said load bearing member transversely of the path of movement of the latter to control the engagement or non-engagement of the actuator with said control member.*

References Cited in the file of this patent or the original patent

UNITED STATES PATENTS

| | | |
|---|---|---|
| 795,124 | Hetzel | July 18, 1905 |
| 1,047,273 | Morris | Dec. 17, 1912 |
| 2,309,587 | Hassler | Jan. 26, 1943 |
| 2,619,370 | Leger | Nov. 25, 1952 |
| 2,619,916 | Rainier | Dec. 2, 1952 |
| 2,635,555 | Hansson | Apr. 21, 1953 |
| 2,660,127 | Boyko et al. | Nov. 24, 1953 |
| 2,684,039 | King | July 20, 1954 |
| 2,688,936 | Brooks | Sept. 14, 1954 |
| 2,816,516 | Diehl | Dec. 17, 1957 |
| 2,871,799 | King | Feb. 3, 1959 |
| 2,875,704 | Yates | Mar. 3, 1959 |